United States Patent Office 2,849,471
Patented Aug. 26, 1958

2,849,471

ORGANOMETALLIC CARBONYL HALIDE COMPOUNDS OF A GROUP VIII METAL DIRECTLY BONDED TO ONE CYCLOPENTADIENYL NUCLEUS AND TO HALOGEN AND CO-ORDINATELY BONDED TO AT LEAST TWO CARBONYL GROUPS, AND THEIR PREPARATION

John C. Thomas, Wilmington, Del., assignor to E. I. du Pont de Nemours and Company, Wilmington, Del., a corporation of Delaware No Drawing. Application January 28, 1955
Serial No. 484,830

17 Claims. (Cl. 260—439)

This invention relates to a new class of organometallic derivatives and their preparation. More particularly, this invention relates to new organometallic carbonyl halide derivatives of group VIII metals and processes for their preparation.

Organometallic compounds, wherein the metal atom is bonded directly to carbon of organic radicals, have found utility in catalytic and synthetic processes. For example, tetraethyllead is used as an antiknock agent in spark ignition engines; organomercury compounds are used in the fungicide field, particularly as seed disinfecetants; and organomagnesium, organosodium and organolithium compounds are used in organic syntheses. Carbonyls of various metals, and in particular of those of group VIII, have found importance in synthetic reactions and as catalysts.

Recently [Kealy and Pauson, Nature 168, 1039 (1951)] there has been disclosed a compound having two cyclopentadienyl radicals directly attached to an iron atom. This compound has been considered unique in that, according to Wilkinson et al. in J. Am. Chem. Soc. 74, 2125 (1952), all five positions of the cyclopentadiene ring in dicyclopentadienylmetallics are equivalent and no isomerism with respect to any one cyclopentadiene ring is possible. Other group VIII organometallics of cyclopentadiene have been reported. For example, the cobalt compound has been prepared by Wilkinson, J. Am. Chem. Soc. 74, 6146–9 (1952), and the nickel derivative is the subject of my U. S. Patent 2,680,758, issued June 8, 1954. Wilkinson has also reported the preparation of corresponding dicyclopentadienyl derivativees of ruthenium, rhodium and iridium. In these organometallic compounds of the group VIII elements, there are two cyclopentadienyl radicals directly linked through carbon thereof to the metal atom. Many investigators have attempted to explain the unusual stability of these compounds as due not only to the particular type of organic radical bonded to the metal, but due also to the fact that there are two radicals so linked.

The preparation and properties of the group VIII derivatives of cyclopentadienes are not completely predictable. As an example, dicyclopentadienyliron has been obtained by reacting cyclopentadiene with iron pentacarbonyl at tempertaures of 220–500° C. under pressure (Anzilotti and Weinmayr, U. S. patent application Serial No. 292,388, filed June 7, 1952, now U. S. Patent 2,791,597, issued May 7, 1957). However, when the temperature is kept below 220° C. and above 160° C., new compounds are obtained which have iron bonded to one cyclopentadienyl group and to carbonyl groups. (Catlin and Thomas, U. S. Patent application Serial No. 365,548, filed July 1, 1953, now U. S. Patent No. 2,810,736, issued October 22, 1957).

It is an object of this invention to provide a new class of organometallic compounds. A further object is to provide new organometallic carbonyl halide compounds of group VIII metals and processes for their preparation. Other objects will appear hereinafter.

These objects are accomplished by the following invention of new organometallic compounds of group VIII metals of Mendeleef's Periodic Table in which the metal is bonded to at least two carbonyl groups and to at least one halogen atom, and is further bonded directly to a carbocyclic hydrocarbon radical containing one cyclopentadiene ring through nuclear carbon of said ring. The preferred class of compounds of this invention are those in which the metal is of the fourth period of group VIII of the periodic table, i. e., a metal of the iron family, and is bonded to (a) a cyclopentadienyl radical through nuclear carbon thereof, (b) two carbonyl groups, and (c) halogen of atomic number 17 to 35, i. e., chlorine or bromine.

The new compounds of this invention are generally obtained by the halogenation, either with free haogen or with a mercuric halide of, e. g., a cyclopentadienyl group VIII metal carbonyl.

The following examples illustrate specific embodiments of the preparation of the new compounds of this invention.

EXAMPLE I

*Preparation of cyclopentadienyliron dicarbonyl chloride by chlorination of bis(cyclopentadienyliron) tetracarbonyl*

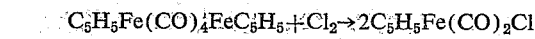

$$C_5H_5Fe(CO)_4FeC_5H_5 + Cl_2 \rightarrow 2C_5H_5Fe(CO)_2Cl$$

The entire preparation as described below was carried out under a nitrogen atmosphere. A solution of 3.6 g. (0.05 mole) of chlorine in 50 ml. of deoxygenated carbon tetrachloride was added dropwise with stirring to a solution of 17.7 g. (0.05 mole) of bis(cyclopentadienyliron) tetracarbonyl in 200 ml. of methylene chloride over a period of 27 minutes. The temperature of the mixture was kept at 20–25° C. by periodic cooling with an ice bath. The mixture was stirred for 30 minutes after completion of the addition and was pressure-filtered.

The solid on the filter was washed three times with deoxygenated carbon tetrachloride. The final washings were colorless. The combined filtrate and washings were evaporated at about 25 mm. pressure in a water bath at 25–30° C. The residue was a dark red solid that weighed 17.3 g. It was ground in a mortar and shaken with 900 ml. of deoxygenated water for 30 minutes. The mixture was pressure-filtered, and the solid was washed once with deoxygenated water. The combined filtrate and washing were extracted with three successive 100-ml. portions of methylene chloride.

The extracts were dried over anhydrous magnesium sulfate and evaporated at room temperature or below in a stream of nitrogen. The residual, red, crystalline solid was dried further at 25° C./25 mm. There was thus obtained 8 g. (38% yield) of a brick-red, crystalline solid that melted at 89–90° C. with decomposition on an electrically heated block. A second extraction with water and methylene chloride by the method just described gave an additional 0.8 g. (additional 4% yield) of a product having the same appearance and melting point. The solid cyclopentadienyliron dicarbonyl chloride was soluble in organic solvents and moderately soluble in water.

*Analysis.*—Calcd. for $C_5H_5Fe(CO)_2Cl$: C, 39.59; H, 2.37; Cl, 16.69; Fe, 26.29; M. W., 212.4. Found: C, 40.40; H, 2.59; Cl, 17.01; Fe, 25.95; M. W., 217 (ebull. in acetone); 205 (cryo. in benzene).

EXAMPLE II

*Preparation of cyclopentadienyliron dicarbonyl chloride by the reaction of bis(cyclopentadienyliron)tetracarbonyl with mercuric chloride*

The entire preparation was carried out under nitrogen. A solution of 32.6 g. (0.12 mole) of mercuric chloride in 300 ml. of deoxygenated, absolute ethanol was added all at once to a solution of 42.6 g. (0.12 mole) of bis(cyclopentadientyliron) tetracarbonyl in 900 ml. of deoxygenated, absolute ethanol with stirring at room temperature. The red color of the mixture lightened almost immediately, and a crystalline precipitate came down. The mixture was stirred for 5 minutes at room temperature and for 10 minutes at 40–45° C., chilled to 5° C., and pressure-filtered.

The solid on the filter was washed two times with cold, deoxygenated, absolute ethanol. This solid, which was crude chloromercuric derivative of cyclopentadienyliron dicarbonyl hydride, could be purified by recrystallization from deoxygenated, absolute ethanol. The combined filtrate and washings were evaporated under about 25 mm. pressure in a bath at 40–45° C. The residual, brick-red solid was shaken with 280 ml. of deoxygenated benzene, and the mixture was pressure-filtered. The solid on the filter was washed once with benzene.

To the clear, dark red filtrate and washing was added 1120 ml. of deoxygenated n-hexane, and the mixture was thoroughly chilled. The solid that precipitated was separated by pressure filtration, washed three times with cold hexane:benzene (4:1), and dried, first in a stream of nitrogen and then at 25° C./0.5 mm. There was thus obtained 18.5 g. (73% yield, based on the theoretical as per the equation) of a brick-red, crystalline solid having the same physical properties as those of the product of Example I.

*Analysis.*—Calcd. for $C_5H_5Fe(CO)_2Cl$: C, 39.59; H, 2.37; Cl, 16.69; Fe, 26.29. Found: C, 38.01; H, 2.49; Cl, 18.12; Fe, 25.44.

EXAMPLE III

*Preparation of cyclopentadienyliron dicarbonyl bromide from dicyclopentadienylcobalt(III) tribromide and the chloromercuric derivative of cyclopentadienyliron dicarbonyl hydride*

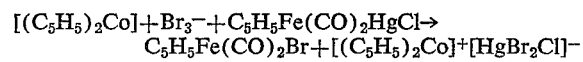

The entire preparation was carried out under nitrogen. A solution of 4.3 g. (0.01 mole) of dicyclopentadienylcobalt(III) tribromide in 200 ml. of methylene chloride was added all at once to a solution of 4.1 g. (0.01 mole) of the chloromercuric derivative of cyclopentadienyliron dicarbonyl hydride (prepared as in Example II) in 41 ml. of methylene chloride. A solid precipitated immediately. The mixture was allowed to stand for 5 minutes and pressure-filtered.

The solid on the filter was washed two times with methylene chloride. The combined filtrate and washings were evaporated at about 25 mm. pressure at room temperature. There was obtained, after complete removal of solvent, about 2.5 g. of a brownish-red solid, which was soluble in organic solvents and slightly soluble in water.

*Analysis.*—Calcd. for $C_5H_5Fe(CO)_2Br$: C, 32.73; H, 1.95; Br, 31.11; Fe, 21.74. Found: C, 32.33; H, 1.93; Br, 33.95; Fe, 20.79.

The dicyclopentadienylcobalt(III) tribromide of Example III was obtained by treatment of dicyclopentadienylcobalt(III) bromide with aqueous bromine as follows:

Bromine was added dropwise with stirring, to a solution of approximately 9.2 g. of dicyclopentadienylcobalt(III) bromide in 230 ml. water until there appeared to be excess bromine present. A precipitate began to appear as soon as the first bromine was added. The solid was separated by filtration, washed with water, and dried. There was obtained 14.5 g. of dicyclopentadienylcobalt(III) tribromide. Recrystallization by dissolving the product in methylene chloride and precipitating with benzene gave 10.5 g. of the tribromide. The monobromide as well as the corresponding triiodide are shown by Wilkinson, J. Am. Chem. Soc. 74, 6148 (1952).

The bis(cyclopentadienyliron) tetracarbonyl employed in Examples I and II is prepared by the method of Catlin filed July 1, 1953, now Patent No. 2,810,736, issued October 22, 1957, i. e., the reaction of iron petacarbonyl at a temperature of preferably about 200° C. with cyclopentadiene as follows:

Ninety-eight grams (0.5 mole) of iron pentacarbonyl and 66 g. (1.0 mole) of cyclopentadiene in the form of its dimer were charged into a stainless steel bomb under dry nitrogen. The bomb was closed, evacuated, vented with dry nitrogen to atmospheric pressure, and heated at 200° C. with rocking over a period of about 2 hours, and then allowed to cool to room temperature. The product was a dark brown mixture of a viscous liquid and a crystalline solid. The solid was broken up under 200 ml. of n-hexane, and the mixture was chilled in ice and pressure-filtered under dry nitrogen. The solid on the filter was washed twice with cold n-hexane and dried in a stream of dry nitrogen. There was thus obtained 59 g. (67%) of a dark red, crystalline solid, which was shown by analysis to be substantially pure bis(cyclopentadienyliron) tetracarbonyl.

It will be understood that the above examples are merely illustrative and that the invention broadly comprises the production of organometallic compounds in which a group VIII metal is co-ordinately bonded to at least two carbonyl groups, co-valently bonded to a carbocyclic hydrocarbon radical containing a cyclopentadiene ring through nuclear or ring carbon of said cyclopentadiene ring, and to halogen. These new compounds have the formula $RM(CO)_mX_n$, wherein R is the carbocyclic hydrocarbon radical containing a cyclopentadiene ring, M is a gorup VIII metal, X is a halogen and $m$ is an integer of at least two and $n$ is an integer of at least 1 and their sum is generally three. Thus, when $m$ is 2 and $n$ is 1, the formula is $RM(CO)_2X$, R being a carbocyclic hydrocarbon radical defined as aforesaid, particularly the cyclopentadienyl radical, and M being a group VIII metal, particularly of the fourth period, i. e., the iron family, iron, cobalt and nickel.

Although compounds where R is the cyclopentadienyl radical are particularly suited for reasons of availability and reactivity, this invention is not so limited. Also included are those compounds where R is a carbocyclic hydrocarbon radical of five to twelve carbons containing a cyclopentadiene ring. Examples of such hydrocarbon-substituted cyclopentadienyl radicals are those of 1,3-diphenylcyclopentadiene and 1,3 - dimethylcyclopentadiene. Radicals of polycyclic compounds, such as indene, 3-phenylindene and 1,3-dimethylindene are also included.

It is generally preferred that the compounds have substituents on no more than four of the nuclear carbons. Particularly useful are carbocyclic hydrocarbons which contain 5 to 12 carbons and have a cyclopentadienyl group. It is preferred that the carbocyclic hydrocarbon radical be the unsubstituted cyclopentadienyl radical or a hydrocarbon substituted cyclopentadienyl radical having at most one monovalent hydrocarbon substituent, preferably aliphatically saturated, of one to six carbon atoms, and most preferably lower alkyl groups.

The halogens which are particularly desired in the new carbonyl halides of this invention are chlorine and bromine since they are cheap and readily available. However, the other halides, i. e., the carbonyl fluorides and iodides, are also useful and available. For example, cyclopentadienyliron dicarbonyl iodide can be obtained by treatment of bis(cyclopentadienyliron) tetracarbonyl with iodine by the general method of Example I, or with mercuric iodide by the general method of Example II. The iodide can also be obtained by treatment of the chloromercuric derivative of cylopentadienyliron dicarbonyl hydride with iodine. Cyclopentadienyliron dicarbonyl fluoride can be obtained by the reaction of bis(cyclopentadienyliron) tetracarbonyl with mercuric fluoride.

The compounds thus embraced by this invention have a group VIII metal bonded directly to a carbocyclic hydrocarbon radical containing the cyclopentadiene ring through ring carbon thereof, and also have bonded to the metal two carbonyl groups, i. e., two CO groups, and at least one halogen atom. Compounds specifically included in the scope of this invention, in addition to those previously named, are methylclopentadienyliron dicarbonyl bromide, phenylcyclopentadienyliron dicarbonyl chloride, ethyl-cyclopentadienylnickel dicarbonyl bromide, cyclopentadienylcobalt dicarbonyl chloride, and the corresponding carbonyl halides of ruthenium, osmium, and platinum. Thus, the compounds of this invention contain a metal of Group VIII of the Periodic Table according to Mendeleef, i. e., a metal of the iron family or a platinum metal.

The compounds of this invention are readily and preferably obtained by the reaction of halogen, particularly chlorine or bromine, upon a bis(hydrocarbon-substituted cyclopentadienyl group VIII metal) tetracarbonyl compound, or a bis(cyclopentadienyl group VIII metal) tetracarbonyl compound, such as bis(cyclopentadienyliron) tetracarbonyl, bis(cyclopentadienylnickel) tetracarbonyl, bis(cyclopentadienylruthenium) tetracarbonyl, bis(cyclopentadienylosmium) tetracarbonyl or other similar group VIII metal carbonyls. This method is carried out in solution, preferably in a halogenated aliphatic hydrocarbon, at a temperature of 0–50° C., and generally gives a purer product than other methods.

Another method involves the use of a mercuric halide as illustrated in Example II while a further method employs a chloromercuric derivative i. e., salt, of a cyclopentadienylmetal carbonyl hydride to react with an ionic dicyclopentadienylmetal halide as shown in Example III. These methods also can be carried out in solution at temperatures of 0 to 50° C.

The compounds of this invention are particularly useful as antiknock agents in spark ignition engines. They can also be used as catalysts for organic reactions, for example, in carbon monoxide reactions. The compounds react with alkali metal cyanides, such as potassium cyanide, to yield cyclopentadienylmetal compounds which also contain carbonyl and cyano groups in addition to the alkali metal. These products are useful as catalysts. They are water soluble.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

I claim:

1. Process for preparing a cyclopentadienyliron dicarbonyl halide which comprises reacting a halogen in solution with bis(cyclopentadienyliron) tetracarbonyl at a temperature of 0 to 50° C.

2. Process for preparing cyclopentadienyliron dicarbonyl chloride which comprises reacting chlorine in solution with bis(cyclopentadienyliron) tetracarbonyl at a temperature of 0 to 50° C.

3. Process for preparing a cyclopentadienyliron dicarbonyl halide which comprises reacting a mercuric halide in solution with bis(cyclopentadienyliron) tetracarbonyl at a temperature of 0 to 50° C.

4. Process for preparing cyclopentadienyliron dicarbonyl chloride which comprises reacting mercuric chloride in solution with bis(cyclopentadienyliron) tetracarbonyl at a temperature of 0 to 50° C.

5. An organometallic carbonyl halide of a group VIII metal in which said metal is co-ordinately bonded to each of at least two carbonyl groups and is further directly bonded to halogen and to a carbocyclic hydrocarbon radical containing a cyclopentadiene ring through nuclear carbon of said ring, said carbocyclic hydrocarbon radical containing not more than 12 carbon atoms.

6. An organometallic carbonyl halide of a group VIII metal in which said metal is co-ordinately bonded to each of at least two carbonyl groups and is further directly bonded to a cyclopentadienyl radical through nuclear carbon thereof and to halogen.

7. An organometallic carbonyl halide of a group VIII metal in which said metal is of the iron family and is coordinately bonded to each of two carbonyl groups and is further directly bonded to halogen and to a carbocyclic hydrocarbon radical containing a cyclopentadiene ring through nuclear carbon of said ring, said carbocyclic hydrocarbon radical containing not more than 12 carbon atoms with at most one monovalent hydrocarbon substituent on its cyclopentadiene ring.

8. An organometallic carbonyl halide of a group VIII metal in which said metal is of the iron family and is co-ordinately bonded to each of two carbonyl groups and is further directly bonded to a cyclopentadienyl radical through nuclear carbon thereof and to halogen.

9. An organoiron carbonyl halide in which iron is co-ordinately bonded to each of two carbonyl groups and is further directly bonded to halogen and to a carbocyclic radical containing a cyclopentadiene ring through nuclear carbon of said ring, said carbocyclic hydrocarbon radical containing no more than 12 carbon atoms with at most one monovalent hydrocarbon substituent on its cyclopentadiene ring.

10. A cyclopentadienyliron dicarbonyl halide of the formula $$RM(CO)_2X$$

wherein R is the cyclopentadienyl radical, X is halogen, and M is iron which is co-ordinately bonded to each of the two carbonyl (CO) groups and is further directly bonded to the cyclopentadienyl radical R through nuclear carbon thereof and to halogen X.

11. Cyclopentadienyliron dicarbonyl chloride of the formula $$C_5H_5Fe(CO)_2Cl$$

wherein $C_5H_5$ is the cyclopentadienyl radical and iron (Fe) is co-ordinately bonded to each of the two carbonyl (CO) groups and is further directly bonded to the cyclopentadienyl radical ($C_5H_5$) through nuclear carbon thereof and to chlorine (Cl).

12. Cyclopentadienyliron dicarbonyl bromide of the formula $$C_5H_5Fe(CO)_2Br$$

wherein $C_5H_5$ is the cyclopentadienyl radical and iron (Fe) is co-ordinately bonded to each of the two carbonyl (CO) groups and is further directly bonded to the cyclopentadienyl radical ($C_5H_5$) through nuclear carbon thereof and to bromine (Br).

13. Process for preparing an organometallic dicarbonyl halide which comprises reacting in solution, at a temperature of 0 to 50° C., a halogenating agent selected from the class consisting of halogen and a mercuric halide with a bis(carbocyclic metal) tetracarbonyl compound wherein said metal is from group VIII of the periodic table and said carbocyclic radical is hydrocarbon of not more than 12 carbon atoms and contains a cyclopentadiene ring bonded directly to said metal through nuclear carbon of said ring.

14. Process for preparing an organometallic dicarbonyl halide which comprises reacting in solution, at a temperature of 0 to 50° C., a halogenating agent selected from the class consisting of halogen and a mercuric halide with a bis(carbocyclic metal) tetracarbonyl compound wherein said metal is from the iron family of group VIII of the periodic table and said carbocyclic radical is hydrocarbon of not more than 12 carbon atoms and contains the cyclopentadiene ring bonded directly to said metal through nuclear carbon of said ring.

15. Process for preparing an organoiron dicarbonyl halide which comprises reacting in solution, at a temperature of 0 to 50° C., a halogenating agent selected from the class consisting of halogen and a mercuric halide with a bis(carbocyclic iron) tetracarbonyl compound wherein said carbocyclic radical is hydrocarbon of not more than 12 carbon atoms and contains a cyclopentadiene ring bonded directly to iron through nuclear carbon of said ring.

16. Process for preparing a cyclopentadienylmetal dicarbonyl halide which comprises reacting in solution, at a temperature of 0 to 50° C., a halogenating agent selected from the class consisting of halogen and a mercuric halide with a bis(cyclopentadienyl metal) tetracarbonyl compound wherein said metal is from group VIII of the periodic table.

17. Process for preparing a cyclopentadienylmetal dicarbonyl halide which comprises reacting in solution, at a temperature of 0 to 50° C., a halogenating agent selected from the class consisting of halogen and a mercuric halide with a bis(cyclopentadienyl metal) tetracarbonyl compound wherein said metal is from the iron family of group VIII of the periodic table.

No references cited.